(12) United States Patent
Hagelstein et al.

(10) Patent No.: US 8,051,842 B2
(45) Date of Patent: Nov. 8, 2011

(54) INTERNAL COMBUSTION ENGINE WITH AN EXHAUST-GAS TURBOCHARGER AND A CHARGE-AIR COOLER AND METHOD FOR OPERATING AN INTERNAL COMBUSTION ENGINE

(75) Inventors: Dirk Hagelstein, Braunschweig (DE); Jens Kühlmeyer, Gifhorn (DE); Eckhard Pult, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 12/769,620

(22) Filed: Apr. 28, 2010

(65) Prior Publication Data
US 2010/0263641 A1 Oct. 21, 2010

Related U.S. Application Data

(63) Continuation of application No. PCT/EP2008/007948, filed on Sep. 20, 2008.

(30) Foreign Application Priority Data

Oct. 29, 2007 (DE) .......................... 10 2007 051 505

(51) Int. Cl.
*F02M 25/07* (2006.01)
*F02B 47/08* (2006.01)
*F02B 33/44* (2006.01)
*F02B 29/04* (2006.01)

(52) U.S. Cl. ...... 123/568.12; 60/599; 60/602; 60/605.2; 123/563

(58) Field of Classification Search ............ 60/599–602, 60/605.2, 608; 123/41.31, 196 AB, 563, 123/568.12; 701/101–103, 108
See application file for complete search history.

(56) References Cited

U.S. PATENT DOCUMENTS

| 1,807,042 | A | * | 5/1931 | Lockhart et al. ........... 123/41.31 |
| 3,444,845 | A | * | 5/1969 | Scheiterlein .................... 60/599 |
| 3,976,041 | A | * | 8/1976 | Mettig et al. .................. 123/563 |
| 4,269,158 | A | * | 5/1981 | Berti ............................. 123/563 |

(Continued)

FOREIGN PATENT DOCUMENTS

CH 366169 A 12/1962

(Continued)

OTHER PUBLICATIONS

Search Report issued by the German Patent Office for German Patent Application No. DE 10 2007 051 505.9 dated Jun. 25, 2008.

(Continued)

*Primary Examiner* — Willis Wolfe, Jr.
(74) *Attorney, Agent, or Firm* — Manfred Beck, P.A.

(57) ABSTRACT

An internal combustion engine includes an intake manifold in a fresh air system. The intake manifold opens into inlet ports of a cylinder head. An exhaust-gas turbocharger has a turbine and a compressor, which is driven by the turbine. The turbine is disposed in the exhaust-gas system. The compressor is disposed in the fresh air system. The turbine has a turbine wheel and a wastegate channel configured to allow a bypassing flow of exhaust-gas past the turbine wheel of the turbine. A wastegate valve is disposed in the wastegate channel for selectively opening and closing the wastegate channel. An electric actuator is provided for operating the wastegate valve. A charge-air cooler is disposed, downstream of the compressor, in the fresh air system. The charge-air cooler is integrated into the intake manifold and is embodied with a water-cooled heat exchanger.

15 Claims, 1 Drawing Sheet

U.S. PATENT DOCUMENTS

| | | | |
|---|---|---|---|
| 5,261,356 A * | 11/1993 | Takahashi et al. | 123/41.31 |
| 5,269,143 A | 12/1993 | Cikanek et al. | |
| 6,134,888 A * | 10/2000 | Zimmer et al. | 60/600 |
| 6,227,179 B1 | 5/2001 | Eiermann et al. | |
| 6,619,275 B2 * | 9/2003 | Wiik | 123/563 |
| 7,725,238 B2 * | 5/2010 | Perkins | 701/103 |
| 2006/0213194 A1 | 9/2006 | Hasegawa | |

FOREIGN PATENT DOCUMENTS

| | | |
|---|---|---|
| DE | 19824913 A1 | 12/1999 |
| DE | 19840616 C1 | 12/1999 |
| DE | 19927607 A1 | 12/2000 |
| DE | 10215779 B4 | 1/2006 |
| DE | 102006000136 A1 | 10/2006 |
| DE | 102005056011 A1 | 6/2007 |
| EP | 0084091 A1 | 7/1983 |
| EP | 0972918 A2 | 1/2000 |
| JP | 62007925 A * | 1/1987 ... 123/563 |

OTHER PUBLICATIONS

International Search Report (Form PCT/ISA/210) for International Application PCT/EP2008/007948, dated Jan. 13, 2009 including translation.

International Preliminary Report on Patentability (Form PCT/IB/373 and Form PCT/ISA/237) for International Application PCT/EP2008/007948, dated May 4, 2010 including translation.

* cited by examiner

INTERNAL COMBUSTION ENGINE WITH AN EXHAUST-GAS TURBOCHARGER AND A CHARGE-AIR COOLER AND METHOD FOR OPERATING AN INTERNAL COMBUSTION ENGINE

CROSS-REFERENCE TO RELATED APPLICATIONS

This application is a continuation, under 35 U.S.C. §120, of copending International Application No. PCT/EP2008/007948, filed Sep. 20, 2008, which designated the United States; this application also claims the priority, under 35 U.S.C. §119, of German Patent Application No. DE 10 2007 051 505.9, filed Oct. 29, 2007; the prior applications are herewith incorporated by reference in their entirety.

BACKGROUND OF THE INVENTION

Field of the Invention

The invention relates to an internal combustion engine having an exhaust-gas turbocharger and a charge-air cooler. The invention furthermore relates to a method for operating an internal combustion engine.

In case of conventional wastegate turbochargers, the boost-pressure control for engines operating with an exhaust-gas turbocharging is carried out with pneumatic pressure actuators, which is for example disclosed in German Patent Application Publication No. DE 198 24 913 A1. In turbocharged Otto cycle engines, turbochargers with a fixed geometry and a wastegate control are predominantly used because primarily the high cost of the VTG technology (variable turbine geometry), which is used for diesel engines, is an obstacle to its widespread use, wherein the high cost is a result of the substantially higher exhaust-gas temperatures when compared to diesel engines. For price-sensitive applications, the turbocharged Otto cycle engine will therefore continue to have a fixed geometry exhaust-gas turbocharger and a wastegate control.

The development of these engines is increasingly marked by a high low-end torque and a lag-free response characteristic. These circumstances are accommodated by an exhaust-gas turbocharger design which is specifically optimized for the lower rotational speed range. Exhaust-gas turbochargers of this type are very small with respect to their throughput capacity relative to the displacement of the engine so that they can realize high pressure ratios through the charger even at small exhaust-gas mass flows. At high engine speeds and large exhaust-gas mass flows, correspondingly large amounts of exhaust-gas must be routed past the turbine via the wastegate.

The demands on the wastegate actuator correspondingly result from the fact that the wastegate has to be closed with a high force in a low-end torque and transient operation and that in the range of the rated power output there must be a sufficient control margin to ensure that even in the high level the rated power output can be adjusted reliably and, respectively, a governing control can be performed for protecting against overspeed at the exhaust-gas turbocharger. In addition, the exhaust-gas back pressure in the part-load range should be as small as possible in order to be able to set a fuel-efficient minimal charge exchange work. In case of an Otto cycle engine, this tradeoff can be achieved only in an insufficient manner by conventional pneumatic actuators that are controlled with an overpressure. Electrically operated wastegate actuators, which can be operated and, respectively, controlled independent from pressures applied to the engine provide a solution.

An internal combustion engine with an electric actuator for the wastegate and a charge-air cooler is disclosed in German Patent Application Publication No. DE 10 2005 056 011 A1. There are particular advantages for the electric actuation of the wastegate resulting from the fact that the exhaust-gas flow via the wastegate is fed into a separate exhaust-gas path.

SUMMARY OF THE INVENTION

It is accordingly an object of the invention to provide an internal combustion engine and a method for operating an internal combustion engine which overcome the above-mentioned disadvantages of the heretofore-known internal combustion engines and methods for operating an internal combustion engine of this general type and which improve an internal combustion engine of the type mentioned above with regard to fuel consumption and with regard to a response characteristic when there is a load demand.

With the foregoing and other objects in view there is provided, in accordance with the invention, an internal combustion engine, including:
a fresh air system;
a cylinder head having inlet ports;
an intake manifold provided in the fresh air system, the intake manifold opening into the inlet ports of the cylinder head;
an exhaust-gas system;
an exhaust-gas turbocharger having a turbine and a compressor, the compressor being driven by the turbine, the turbine being disposed in the exhaust-gas system, the compressor being disposed in the fresh air system, the turbine having a turbine wheel and having a wastegate channel configured to allow a bypassing flow of exhaust-gas past the turbine wheel of the turbine;
a wastegate valve disposed in the wastegate channel for selectively opening and closing the wastegate channel;
an electric actuator for operating the wastegate valve; and
a charge-air cooler disposed, downstream of the compressor, in the fresh air system, the charge-air cooler being integrated into the intake manifold and being embodied with a water-cooled heat exchanger.

In other words, according to the invention, there is provided an internal combustion engine, in particular an internal combustion engine of a motor vehicle, including an intake manifold in a fresh air system, the intake manifold leading into intake ports in a cylinder head of the internal combustion engine, an exhaust-gas system and an exhaust-gas turbocharger, the exhaust-gas turbocharger having a turbine disposed in the exhaust-gas system and having a compressor disposed in the fresh air system, the compressor being driven by the turbine, wherein the turbine has a wastegate channel for providing a bypassing flow of exhaust-gas past a turbine wheel of the turbine, wherein a wastegate valve for selectively opening and closing the wastegate channel is disposed in the wastegate channel, wherein an electric actuator for operating the wastegate valve is provided, wherein, downstream of the compressor, a charge-air cooler is disposed in the fresh air system, wherein the charge-air cooler is integrated in the intake manifold, and wherein the charge-air cooler is embodied with a water-cooled heat exchanger.

This has the advantage that, as a result, there is a small volume in the fresh air system downstream of the compressor, whereby, even with an opened wastegate valve or wastegate flap in the part-load operation, a quick response of the internal combustion engine is ensured in case of a load demand. Thus, the reduced fuel consumption by opening the wastegate valve in the part-load range is no longer combined with a deterioration in the response behavior when there is a load demand.

According to another feature of the invention, the water-cooled heat exchanger of the charge-air cooler is connected to a cooling circuit of the internal combustion engine.

According to a preferred feature of the invention, the charge-air cooler is a water-air charge-air cooler.

According to another feature of the invention, the electric actuator for operating the wastegate valve has an electric motor disposed and configured such that the electric motor converts an electrical output signal of an engine control unit directly into an actuation movement of the wastegate valve.

According to another feature of the invention, the wastegate valve is embodied as a wastegate flap.

According to another feature of the invention, the internal combustion engine is a motor vehicle engine.

With the objects of the invention in view there is also provided, a method for operating an internal combustion engine, the method including the steps of:

providing a flow of exhaust-gas over a turbine of an exhaust-gas turbocharger, the turbine of the exhaust-gas turbocharger being disposed in an exhaust-gas system;

driving, with the turbine, a compressor disposed in a fresh air system;

providing, via an intake manifold of the fresh air system, a flow of fresh air into intake ports in a cylinder head of the internal combustion engine such that the fresh air flows through a water-cooled heat exchanger disposed downstream of the compressor, the water-cooled heat exchanger being integrated in the intake manifold; and actuating a wastegate valve with an electric actuator and selectively opening and closing a wastegate channel with the wastegate valve assigned to the wastegate channel such that exhaust-gas selectively flows via the wastegate channel bypassing the turbine.

In other words, according to the invention, there is provided a method of operating an internal combustion engine, in particular an internal combustion engine of a motor vehicle, wherein fresh air flows, via an intake manifold of a fresh air system, into the inlet ports in a cylinder head of the internal combustion engine, wherein exhaust-gas flows over a turbine of an exhaust-gas turbocharger, the turbine being disposed in the exhaust-gas system, wherein the turbine drives a compressor disposed in the fresh air system, wherein the exhaust-gas selectively flows via a wastegate channel bypassing the turbine, wherein a wastegate valve, which is assigned to the wastegate channel, selectively opens and closes the wastegate channel, wherein the wastegate valve can be actuated by an electric actuator, and wherein fresh air flows through a water-cooled heat exchanger which is disposed downstream of the compressor and which is integrated into the intake manifold.

Another mode of the invention includes connecting the water-cooled heat exchanger to a cooling circuit of the internal combustion engine.

Another mode of the invention includes converting, with an electric motor of the electric actuator, output signals of an engine control unit into an actuating movement of the wastegate valve.

Another mode of the invention includes controlling the electric actuator additionally in dependence on an accelerator pedal gradient.

Another mode of the invention includes immediately closing the electric wastegate valve when an accelerator pedal is pressed down quickly.

Another mode of the invention includes keeping the wastegate valve closed until a maximum allowable boost pressure is reached, unless a driver eases off the accelerator pedal prior thereto.

Another mode of the invention includes controlling the wastegate valve in dependence on a characteristic diagram such that, in a rotational speed/relative mean pressure characteristic diagram, the wastegate valve is closed in a first characteristic diagram region, the wastegate valve is open in a second characteristic diagram region and the wastegate valve is controlled in a third characteristic diagram region.

Another mode of the invention includes effecting a dethrottling in a part-load operation of the internal combustion engine by opening the wastegate valve in the part-load operation.

Another mode of the invention includes using the internal combustion engine in a motor vehicle.

Other features which are considered as characteristic for the invention are set forth in the appended claims.

Although the invention is illustrated and described herein as embodied in an internal combustion engine with an exhaust-gas turbocharger and a charge-air cooler and a method for operating an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
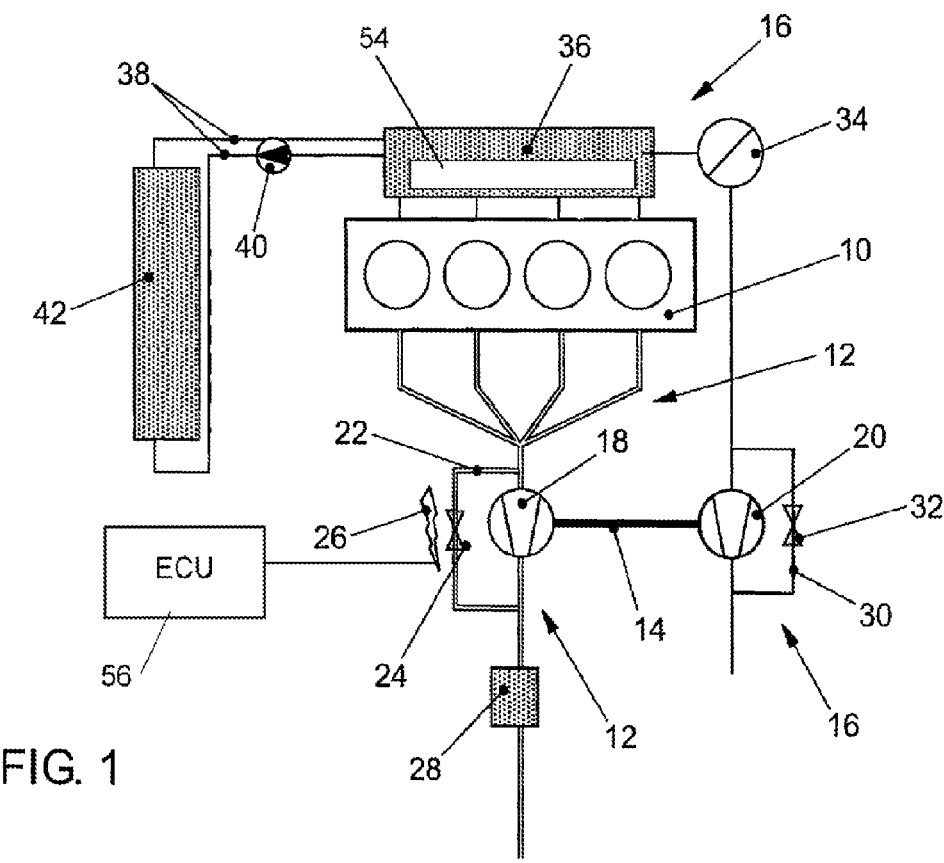
FIG. 1 is a schematic illustration of a preferred embodiment of an internal combustion engine according to the invention.

Referring now to the figures of the drawings in detail and first, particularly, to FIG. 1 thereof, there is shown a preferred embodiment of an internal combustion engine according to the invention which includes an engine block 10, an exhaust-gas system 12, an exhaust-gas turbocharger 14 (EGT) and a fresh air system 16. The exhaust-gas turbocharger 14 has a turbine 18 disposed in the exhaust-gas system 12 and a compressor 20 disposed in the fresh air system 16. In the exhaust-gas system 12 there is furthermore a wastegate channel 22 with a wastegate valve 24 disposed such that a portion of the exhaust-gas is selectively routed past the turbine by opening the wastegate valve 24. The wastegate valve 24, which is preferably embodied as a wastegate flap, has an electric actuator 26 for actuating the wastegate valve 24. A catalytic converter 28, in particular a pre-catalytic converter or a main catalytic converter close to the engine, is disposed downstream of the turbine 18 in the exhaust-gas system 12.

A bypass channel 30 bypassing the compressor 28 and having a divert air valve 32 is disposed in the fresh air system 16. Furthermore, a throttle valve 34 and an intake manifold 36 are disposed in the fresh air system 16. A charge-air cooler 54 with a water-cooled heat exchanger is integrated in the intake manifold 36. This water-cooled heat exchanger is connected to a cooling water circuit 38 of the internal combustion engine. This cooling water circuit 38 has a pump 40 and a low-temperature cooler 42

Figure 2:
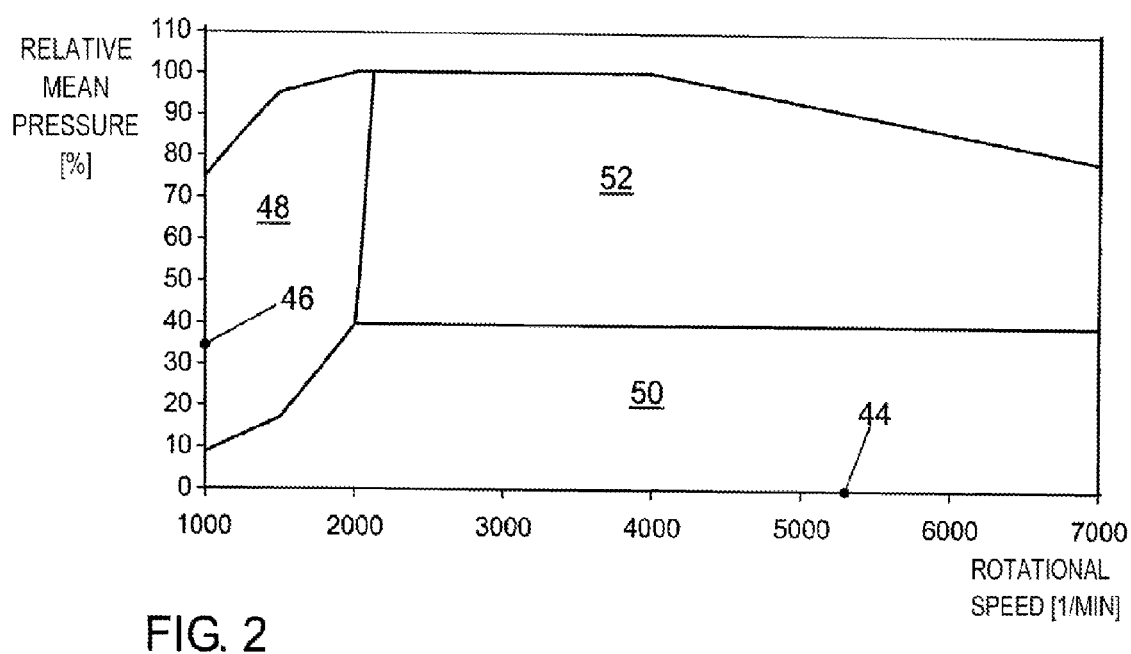
FIG. 2 is a characteristic diagram for a control of the wastegate through the use of an electric actuator in accordance with the invention.

FIG. 2 shows a characteristic diagram (characteristic map) for a control of the wastegate valve 24 through the use of the electric actuator 26. In FIG. 2, a rotational speed in [1/min] is plotted on a horizontal axis 44 and a relative mean pressure in [%] is plotted on a vertical axis 46. In a first region 48 of the characteristic diagram, the wastegate valve 24 is closed, in a second region 50 of the characteristic diagram, the wastegate valve 24 is open, and in a third region 52 of the characteristic diagram, the wastegate valve 24 is controlled.

In addition, the actuator control is also performed in dependence on an accelerator pedal gradient in a manner such that when the pedal is pressed down quickly, the wastegate valve 24 is in principle immediately closed and remains closed until the maximum allowable boost pressure is achieved, unless, prior thereto, the driver eases off the accelerator.

In order that the advantage of the dethrottling in the part-load operation through an open wastegate valve 24 can be translated into a corresponding fuel consumption advantage, the charge-air cooler is integrated in the intake manifold 36 and is equipped with a water-cooled heat exchanger in accordance with the invention. This ensures that the wastegate valve 24 that is opened in the part-load entails no noticeable delay in the response characteristic of the engine, because there is only a small air volume between the exhaust-gas turbocharger compressor outlet and the inlet into the combustion chambers of the internal combustion engine. Therefore, the two technologies "electric wastegate actuator" and a "water-cooled charge air cooler integrated in the intake manifold" are combined according to the invention.

Only through the combination of the two known technologies, namely "water-air charge-air cooler integrated in the intake manifold 36" and "electric wastegate actuator" is it possible to realize the advantages of the electric wastegate actuator in practice.

The electric wastegate actuator can achieve its advantage, namely the control of the wastegate valve 24 independent of operating-point dependent pressures, only by the resulting very small compressed air volume due to the water-air charge-air cooler integrated in the intake manifold 36, without having to accept a deterioration of the dynamics when there is a load demand from a low part-load with in this case an opened wastegate valve 24, in which case the entire compressed air volume is at a significantly lower pressure level than in the case of conventional pneumatic actuators, which however also cause a 1-2% higher fuel consumption.

If the wastegate valve 24 is already closed in the low part-load, the dynamic behavior is indeed improved at least to the level of pneumatic actuators, but the consumption in the entire characteristic diagram region is in an undesirable manner on the poorer level of pneumatic wastegate actuators.

When the wastegate valve 24 is open in the part-load, which is the desired state, because the primary motivation for the use of an electric wastegate actuator 26 is the reduction of consumption, the dynamics as well as the consumption can be improved by the use of an electric wastegate actuator 26, because through the combination of the charge-air cooler integrated in the intake manifold 36 and the electric wastegate actuator 26, the consumption can be improved without having to suffer a disadvantage with respect to the dynamic behavior. As a result of this, it is furthermore feasible to control the wastegate valve 24 strictly in accordance with engine-related, thermodynamic criteria. The characteristic diagram according to FIG. 2 results from that. The advantages of the electric control are maximized with the operating strategy of an electric wastegate actuator 24 presented here. The prerequisite for the implementation of this characteristic diagram according to FIG. 2 is the water-air charge-air cooler integrated in the intake manifold 36.

In this case, an electric wastegate actuator 26 is understood as an actuator, which directly converts an electrical output signal of an engine control unit (ECU) 56, through the use of an electric motor, into the desired actuation movement of the wastegate valve or waste gate flap. This means independence from operating-point dependent supply pressures of the engine.

What is claimed is:

1. An internal combustion engine, comprising:
   a fresh air system;
   a cylinder head having inlet ports;
   an intake manifold provided in said fresh air system, said intake manifold opening into said inlet ports of said cylinder head;
   an exhaust-gas system;
   an exhaust-gas turbocharger having a turbine and a compressor, said compressor being driven by said turbine, said turbine being disposed in said exhaust-gas system, said compressor being disposed in said fresh air system, said turbine having a turbine wheel and having a wastegate channel configured to allow a bypassing flow of exhaust-gas past said turbine wheel of said turbine;
   a wastegate valve disposed in said wastegate channel for selectively opening and closing said wastegate channel;
   an electric actuator for operating said wastegate valve; and
   a charge-air cooler disposed, downstream of said compressor, in said fresh air system, said charge-air cooler being integrated into said intake manifold and being embodied with a water-cooled heat exchanger.

2. The internal combustion engine according to claim 1, comprising a cooling circuit, said water-cooled heat exchanger of said charge-air cooler being connected to said cooling circuit.

3. The internal combustion engine according to claim 1, wherein said charge-air cooler is a water-air charge-air cooler.

4. The internal combustion engine according to claim 1, including an engine control unit, said electric actuator for operating said wastegate valve having an electric motor disposed and configured such that said electric motor converts an electrical output signal of said engine control unit directly into an actuation movement of said wastegate valve.

5. The internal combustion engine according to claim 1, wherein said wastegate valve is embodied as a wastegate flap.

6. The internal combustion engine according to claim 1, wherein the internal combustion engine is a motor vehicle engine.

7. A method for operating an internal combustion engine, the method which comprises:
   providing a flow of exhaust-gas over a turbine of an exhaust-gas turbocharger, the turbine of the exhaust-gas turbocharger being disposed in an exhaust-gas system;
   driving, with the turbine, a compressor disposed in a fresh air system;
   providing, via an intake manifold of the fresh air system, a flow of fresh air into intake ports in a cylinder head of the internal combustion engine such that the fresh air flows through a water-cooled heat exchanger disposed downstream of the compressor, the water-cooled heat exchanger being integrated in the intake manifold; and
   actuating a wastegate valve with an electric actuator and selectively opening and closing a wastegate channel with the wastegate valve assigned to the wastegate channel such that exhaust-gas selectively flows via the wastegate channel, which bypasses the turbine.

8. The method according to claim 7, which comprises connecting the water-cooled heat exchanger to a cooling circuit of the internal combustion engine.

9. The method according to claim 7, which comprises controlling the wastegate valve in dependence on a characteristic diagram such that, in a rotational speed/relative mean pressure characteristic diagram, the wastegate valve is closed in a first characteristic diagram region, the wastegate valve is open in a second characteristic diagram region and the wastegate valve is controlled in a third characteristic diagram region.

10. The method according to claim 7, which comprises effecting a dethrottling in a part-load operation of the internal combustion engine by opening the wastegate valve in the part-load operation.

11. The method according to claim 7, which comprises using the internal combustion engine in a motor vehicle.

12. The method according to claim 7, which comprises converting, with an electric motor of the electric actuator, output signals of an engine control unit into an actuating movement of the wastegate valve.

13. The method according to claim 12, which comprises controlling the electric actuator additionally in dependence on an accelerator pedal gradient.

14. The method according to claim 13, which comprises immediately closing the electric wastegate valve when an accelerator pedal is pressed down quickly.

15. The method according to claim 14, which comprises keeping the wastegate valve closed until a maximum allowable boost pressure is reached, unless a driver eases off the accelerator pedal prior thereto.

* * * * *